United States Patent
Nasu et al.

(10) Patent No.: US 7,300,274 B2
(45) Date of Patent: Nov. 27, 2007

(54) CHANGE-OVER DEVICE FOR CHANGING OVER BETWEEN A HEATING MEDIUM AND A RESIN MATERIAL AT A TIME OF A SECONDARY FORMING

(75) Inventors: Hidehisa Nasu, Oobu (JP); Akira Kuroyanagi, Chiryu (JP); Masato Ichikawa, Kariya (JP); Akira Sahashi, Nagoya (JP)

(73) Assignee: DENSO Corporation, Kariya (JP)

( * ) Notice: Subject to any disclaimer, the term of this patent is extended or adjusted under 35 U.S.C. 154(b) by 288 days.

(21) Appl. No.: 11/079,260

(22) Filed: Mar. 14, 2005

(65) Prior Publication Data
US 2005/0202117 A1    Sep. 15, 2005

(30) Foreign Application Priority Data
Mar. 15, 2004   (JP)   ............... 2004-072697

(51) Int. Cl.
*B29C 45/73* (2006.01)
(52) U.S. Cl. .................... 425/547; 425/548
(58) Field of Classification Search ........... 264/328.14, 264/328.16; 425/547, 548
See application file for complete search history.

(56) References Cited

U.S. PATENT DOCUMENTS
3,733,161 A * 5/1973 Nussbaum .............. 425/547
2003/0111765 A1   6/2003 Ichikawa et al.

FOREIGN PATENT DOCUMENTS
EP             82913      * 4/1982
JP       2003-245980        9/2003

* cited by examiner

*Primary Examiner*—Tim Heitbrink
(74) *Attorney, Agent, or Firm*—Harness, Dickey & Pierce, PLC

(57) ABSTRACT

The device includes: a runner block arranged at a position close to the injection port for resin material for secondary forming; and a slide core moved relatively with the runner block. In the runner block, a guide passage is formed which is communicated with a passage formed when pipe-shaped passages of the primary moldings are butted against each other. A heating medium passage or a resin material passage formed in the slide core are moved so that either the heating medium passage or the resin material passage can be selectively communicated with the guide passage formed in the runner block.

13 Claims, 8 Drawing Sheets

CHANGE-OVER DEVICE FOR CHANGING OVER BETWEEN A HEATING MEDIUM AND A RESIN MATERIAL AT A TIME OF A SECONDARY FORMING

BACKGROUND OF THE INVENTION

1. Field of the Invention

The present invention relates to a method of manufacturing a molding of resin in which a primarily formed resin molding is heated and resin material is injected into the resin molding in the process of secondary forming. The present invention also relates to a change-over device for changing over between a heating medium and resin material in the process of secondary forming.

2. Description of the Related Art

When a hollow resin molding is manufactured and, for example, when an intake manifold for vehicle use is manufactured, it is common that the intake manifold is worked by secondary forming after primary forming has been completed. In this case, the manufacturing process is executed as follows. A primary molding, which has been manufactured to be divided into a plurality of pieces in the process of primary forming, is set in a mold used for secondary forming. Then, the divided primary moldings are butted to each other, and a passage for resin material is formed in the joint portion in which the divided primary moldings are butted to each other. When resin material used for secondary forming is injected into the passage, the intake manifold, which is a resin molding, can be integrally formed.

In the case where the resin molding is an intake manifold, the following problems have been encountered. As the passage formed in the primary molding is long, when secondary forming is conducted at the normal temperature on the primary molding which has already been cooled and solidified, the injected resin material used for secondary forming is quickly cured and the deposition property of the resin material is deteriorated. Accordingly, the deposition strength is lowered.

In order to solve the above problems and enhance the deposition strength, it is conventional to adopt a method in which resin material is injected after only the surface of the joint portion of the primary molding to be joined has been heated. This method is disclosed in the official gazette of JP-A-2003-245980.

According to this method, for example, the resin molding is an intake manifold, and a passage for injecting the resin material for secondary forming is formed in the joint portion of the primary molding, which is butted in the mold of secondary forming in the peripheries of the pipe portion and surge tank portion of the intake manifold. In one end portion of the intake manifold, for example, at one position in one portion of the surge tank, an inlet used for injecting a heating medium is provided. At the other end portion, for example, at an end portion of one pipe, one resin material injecting port is provided. When a heating medium is made to flow into the passage from the inlet used for injecting the resin material before the resin material is injected, the heating medium is sent onto the entire circumference of the passage so that the surface of the joint portion can be heated. After the heating medium has flowed onto the entire circumferential face of the passage, the flow of the heating medium is stopped, and the resin material for secondary forming is injected from the inlet into the thus heated passage.

Due to the foregoing, the primary molding, which has been divided into a plurality of pieces, can be joined by the uniformly heated resin material. Accordingly, the deposition strength can be prevented from being deteriorated.

However, in the forming machine described in the above patent document, the outlet of the heating medium is also used as an inlet of the resin material. Therefore, the temperature of the inlet of the resin is lowered by the heating medium in some cases. For example, when the temperature of the nozzle of the injection molding machine arranged at the inlet is lowered, the fluidity of the resin is deteriorated immediately after the start of injection.

Accordingly, it is desired to prevent the heating medium from flowing to the inlet of the resin material.

According to the method disclosed in the above patent document, as the passage for the resin material is long and further the outlet of the heating medium is also used as an inlet of the resin material, injection of the resin material for secondary forming, which is conducted after the heating medium has flowed into the passage, is delayed. When the injection time of injecting the resin material is delayed, even if the passage is heated, a portion of the injected resin material is cured before the other portions are cured, and the deposition property of the resin material is deteriorated and the deposition strength is lowered.

Therefore, it is desired that the resin material can be injected at a temperature in a uniform temperature range when a change-over cycle for changing over between the inflow of the heating medium and the injection of the resin material is shortened.

SUMMARY OF THE INVENTION

The present invention has been accomplished to solve the above problems. The present invention provides a method and device by which a molding of resin can be excellently formed when the heating medium is prevented from flowing to the inlet of the resin material.

It is an object of the present invention to provide a method of manufacturing a molding of resin and it is another object of the present invention to provide a change-over device for changing over between a heating medium and resin material in which a passage for resin is heated before the resin is injected at the time of secondary forming and when a cycle time of change-over for changing over between the inflow of the heating medium and the injection of the resin material is shortened, the resin material is injected at a temperature in a uniform temperature range so that the deposition property of the resin can be enhanced and the deposition strength can be prevented from deteriorating as a result.

According to the first aspect of the present invention, a change-over device for changing over between a heating medium and resin material at the time of manufacturing a molding of resin includes: a runner block arranged close to an inlet of the resin material for secondary forming; and a slide core moved relatively with the runner block. In the runner block, a guide passage is formed which is communicated with a passage formed when the pipe-shaped passages of the primary molding are butted to each other. The slide core is moved so that one of the heating medium passage and the resin passage, which are formed in the slide core, can be selectively communicated with the guide passage formed in the runner block.

On the other hand, in a plurality of primary moldings which are divided into pieces, joint portions are respectively formed and a pipe-shaped passage is formed on the joining face. When the plurality of primary moldings, which are divided, are butted to each other, the respective pipe-shaped passages form a passage for charging the resin material for secondary forming. The heating medium is made to flow from one side of the passage so that the passage can be heated by the heating medium. After that, the resin material for secondary forming is injected from the other side of the passage.

In the state in which the heating medium flows into the passage, the guide passage formed in the runner block is communicated with the heating medium passage for the slide core. When the heating medium flows in the guide passage, the change-over device is operated and the slide core is moved. In this way, the resin material passage is communicated with the guide passage. Due to the foregoing, the resin material for secondary forming is charged into the passage. When the resin is cooled, a plurality of primary moldings are joined to each other and the secondary molding can be formed.

Accordingly, after the passage to be charged with the resin has been heated by the heating medium, the resin material for secondary forming is injected while a predetermined temperature is being maintained. Therefore, after the temperature of the passage has been raised to a predetermined temperature, the resin material can be injected. Accordingly, the deposition property of the resin can be enhanced, and the deposition strength can be prevented from deteriorating.

Further, since it is possible to change over between the flowing action of the heating medium and the injecting action of the resin material, that is, since it is possible to selectively change over between the heating medium passage and the resin material passage, each action of the secondary forming can be easily controlled and the cycle time can be shortened.

Further, in the second aspect of the present invention, a heating medium discharge passage connected to the heating medium passage is formed. When the heating medium passage is communicated with the heating medium discharge passage, the heating medium is discharged into the atmosphere. Accordingly, when the heating medium flows into the passage, it can be discharged into the atmosphere without being blown onto the injection nozzle. Therefore, it is possible to inject the resin material without a change in the temperature of the nozzle from which the resin material is injected. Consequently, the temperature can be appropriately controlled, and a deterioration of the deposition strength can be prevented.

A change-over device of the third aspect includes: a runner block arranged close to an inlet of injecting the resin material into a mold for forming, for dividing a passage on the mold side and a passage on the injection side; and a movable core provided in the runner block.

The resin material injected from the injection side is injected into the mold side passage of the mold for forming under the condition that the injection side passage and the mold side passage are communicated with each other by the first passage when the movable core is moved which has been changed over by the change-over device.

Under the condition that the movable core is moved by the change-over device and the second passage is communicated with the mold side passage, the second passage is shut off from the injection side passage. Therefore, the heating medium passes through the mold side passage and the second passage. Further, the heating medium passes through the discharge passage and is discharged outside the mold.

Due to the foregoing, the heating medium is discharged outside the mold without flowing to the injection side passage. Therefore, the heating medium does not reach the injection nozzle. Accordingly, even when the resin material is injected from the injection nozzle immediately after the heating medium has flowed into the passage, no temperature drop is caused by the heating medium, and excellent resin forming can be conducted.

According to the fourth aspect of the present invention, when the heating medium is air for heating the primary molding, the discharge passage is a discharge passage for discharging a flow of hot air into the atmosphere. Therefore, the flow of hot air, which has passed through the primary molding so as to heat the primary molding, is discharged from the second passage of the change-over device into the atmosphere. Accordingly, the same effect as that of the third aspect can be provided.

According to the fifth aspect of the present invention, as a temperature sensor is arranged in the second passage, when the heating medium passes in the second passage the temperature of the heating passage can be detected by the temperature sensor so that temperature control can be conducted. For example, when the resin material is injected into the mold side passage, the injection is conducted when the temperature of the heated primary molding is raised to a predetermined temperature. Due to the foregoing, an excellent forming can be conducted without lowering the temperature of the resin material blowing out from the injection nozzle.

According to the sixth aspect of the present invention, the runner block and the movable core are arranged on a mold split face of the mold for forming, and the mold side passage and the injection side passage are divided with respect to the split face and further the first passage and the second passage are divided with respect to the split face. Therefore, the primary molding can be advantageously subjected to secondary forming.

According to the seventh aspect of the present invention, the movable core is a slide core capable of sliding with respect to the runner block, and the first passage and the second passage are arranged in parallel with respect to the sliding direction. Therefore, it is possible to drive the slide core along a straight line. Accordingly, it is possible to compose a simple drive mechanism at a low manufacturing cost.

The present invention may be more fully understood from the description of preferred embodiments of the invention set forth below, together with the accompanying drawings.

DESCRIPTION OF PREFERRED EMBODIMENTS

Next, referring to the drawings, explanations will be given of the method of manufacturing a molding of resin and also of a change-over device for changing over between a heating medium and resin material in secondary forming. In this case, the explanations will be made under the condition that the molding of resin is a hollow intake manifold and the heating medium is a flow of heated air which will be referred to as a flow of hot air hereinafter.

Figure 1:
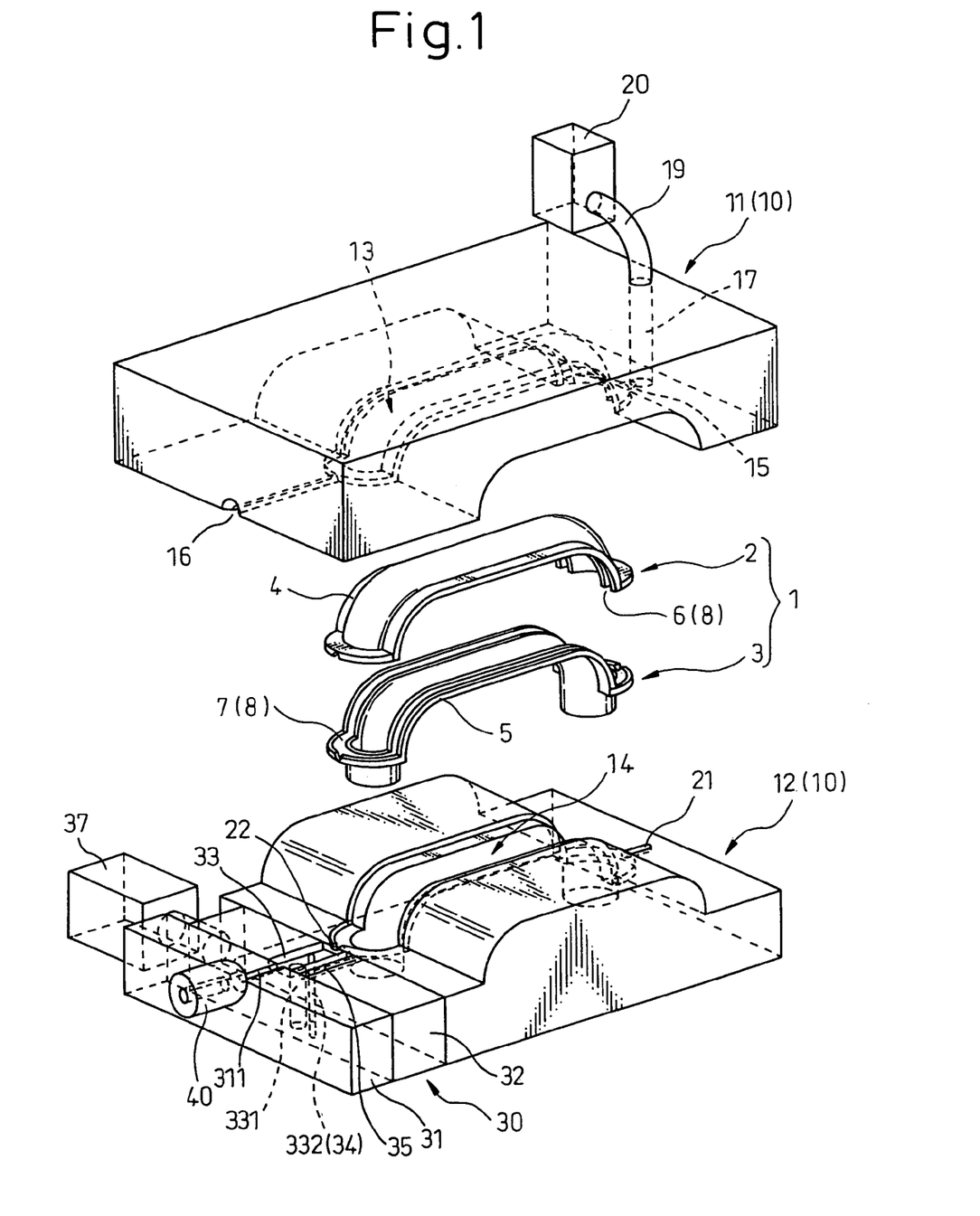
FIG. 1 is an exploded perspective view showing a state in which secondary forming is conducted by a mold for secondary forming of an embodiment of the invention according to the secondary forming method of an embodiment of the present invention.

FIG. 1 is a view showing a state in which the primary moldings 2, 3 of the intake manifold 1, which has been formed by primary molding, are set in the upper mold 11 and the lower mold 12 of the mold 10 for secondary forming.

The joint portions 4, 5, for joining the primary moldings 2, 3 to each other, are formed in the respective primary moldings 2, 3. On the joining faces of the joint portions 4, 5, the semicircular pipe-shaped passages 6, 7 are formed on the entire circumferences. The respective pipe-shaped passages 6, 7 are formed into the passage 8 into which the secondary forming resin material, which will be referred to as resin material hereinafter, is injected at the time of joining the primary moldings 2, 3.

In the upper mold 11, the recess portion 13, into which the primary molding 2 is inserted, is formed into the same shape as that of the primary molding 2, and in the lower mold 12, the recess portion 14, into which the primary molding 3 is inserted, is formed into the same shape as that of the primary molding 3.

At both end portions of the recess portion 13 on the lower face of the upper mold 11, the grooves 15, 16 are formed. The through-hole portion 17 communicated with one groove 15 is formed to penetrate the upper mold 11 from the groove 15 to an upper face of the upper mold 11. The hot air flow generating device 20 is connected to the through-hole portion 17 via the pipe 19.

The grooves 21, 22 are formed at both end portions of the recess portion 14 on an upper face of the lower mold 12. The groove 21 of the lower mold 12 is connected to the groove 15 of the upper mold 11 and also connected to the passage 8 in the mold. The groove 22 is connected to the groove 16 in the upper mold 11 and also connected to the passage 8 in the mold. In this connection, the passage 8 in the mold is formed so that it can be used as a mold side passage.

The change-over device 30 is attached to one end face of the lower mold 12. The change-over device 30 is provided with a change-over valve and is capable of changing over between a flow of hot air, which is sent from the hot air flow generating device 20, and resin material, so that either the flow of hot air or the resin material can be selectively injected into the passage 8.

The change-over device 30 includes: a runner block 31 which supports the injection nozzle 40 and forms the runner 311 connected to the injection nozzle 40; and a slide core 32 which is a movable core slid by the cylinder 37 between the runner block 31 and the lower mold 12. The runner 311 is formed at a position opposed to the groove 22 of the lower mold 12 via the slide core 32.

In the slide core 32, two grooves are formed, which are parallel to each other, in the direction perpendicular to the sliding direction. In one groove, the air passage (the second passage) 331 is formed and receives a flow of air sent from the hot air flow generating device 20. This groove has an air discharge passage 331, which is a discharge passage directed downward from the bottom face of the air passage 33, and also has an insertion hole 332 into which the thermocouple is inserted. The thermocouple 34, which is a temperature sensor for detecting the temperature of a flow of hot air sent from the hot air flow generating device 20, is inserted into the thermocouple insertion hole 332.

In the other groove, the injection passage (the first passage) 35 is formed in which the resin material injected from the injection nozzle 40 flows. When the cylinder 37 is driven, the air passage 33 of the slide core 32 and the injection passage 35 are moved so that either the air passage 33 of the slide core 32 or the injection passage 35 can be selectively arranged between the runner 311 of the runner block 31 and the groove 22 of the lower mold 12.

In this connection, when the upper mold 11 is closed so that it can be contacted with the lower mold 12, the runner 311 becomes an injection side passage and is opposed to the passage 8 which is a mold side passage.

Next, explanations will be made into the secondary forming method which is a method of manufacturing this resin molding 1. According to this secondary forming method, when a flow of hot air is sent into the passage 8 from the opposite side to the injection nozzle 40 side before the resin material for secondary forming is injected, the resin material can be injected at a temperature in a predetermined temperature range. In this case, the injection temperature is controlled when the temperature in the passage 8 is measured, for example, by the thermocouple 34 arranged at a position close to the outlet of the flow of hot air.

Figure 2:
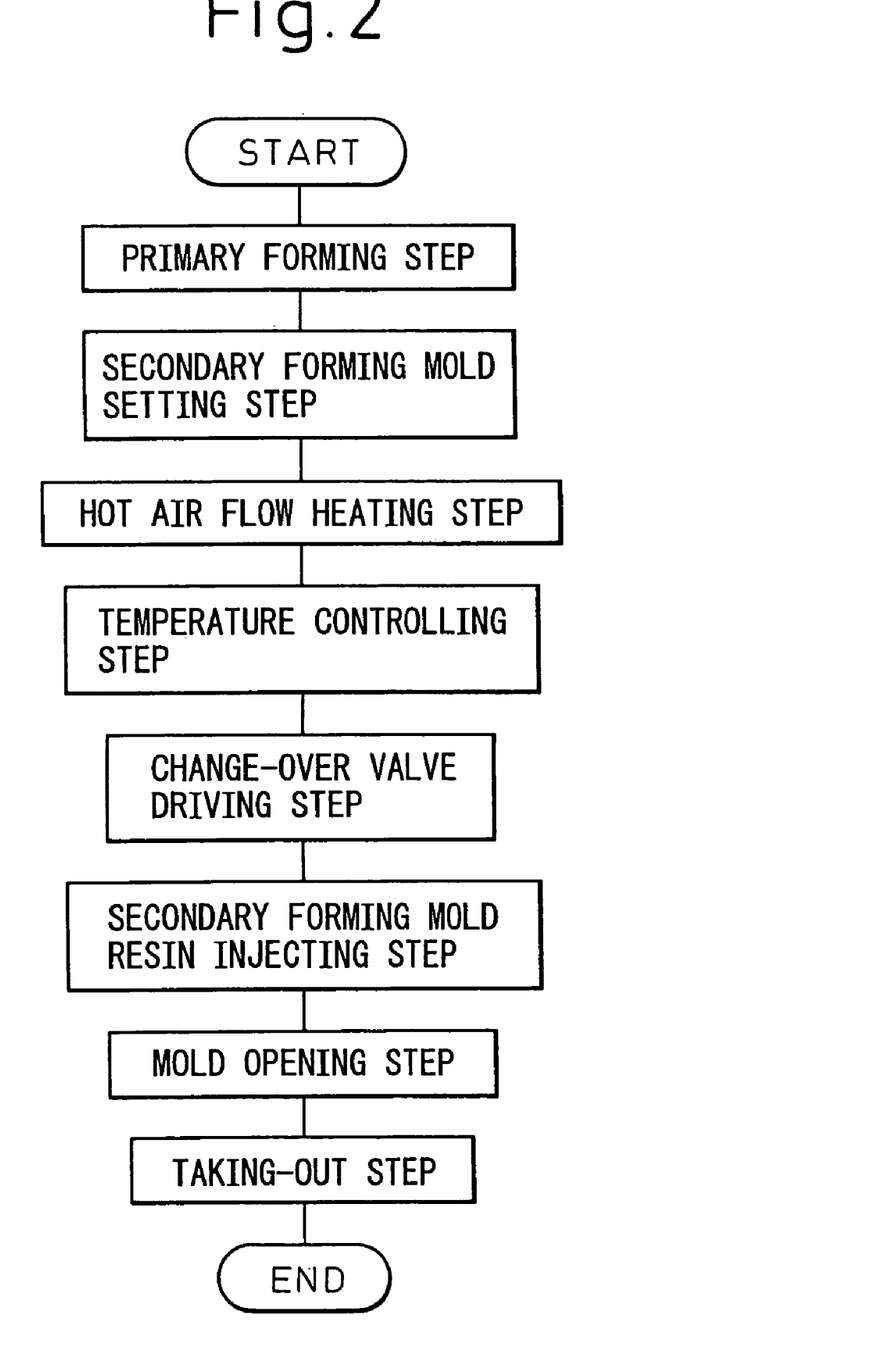
FIG. 2 is a flow chart showing the secondary forming method shown in FIG. 1.

Accordingly, as shown in the flow chart of FIG. 2, the intake manifold 1 is secondarily formed via the primary forming step in which the primary molding is primarily formed, the mold setting step in which the primary molding is set in the mold for secondary forming, the hot air flow heating step in which a flow of hot air is blown, the temperature control step in which the temperature of a flow of hot air is actually measured at a position close to the outlet, the change-over valve driving step in which the open passage is changed over by the change-over device, the secondary forming resin injecting step in which the resin material is injected from the injection nozzle, the mold opening step and the secondary molding taking-out step.

Figure 3:
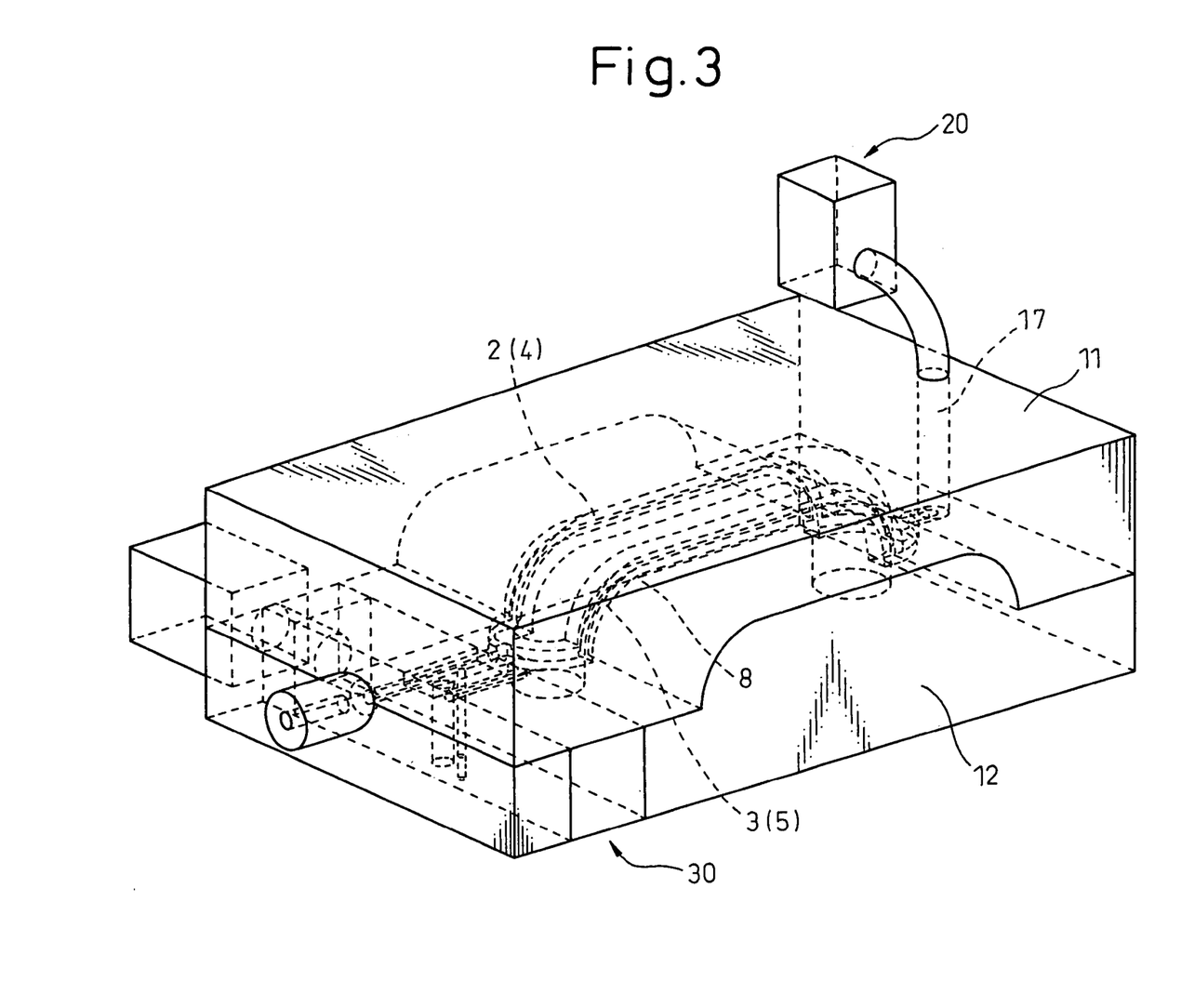
FIG. 3 is a perspective view showing a state in which the mold for secondary forming shown in FIG. 1 is closed.

That is, as shown in FIG. 1, a plurality of primary moldings 2, 3, which have been primarily formed, are respectively inserted into the recess portion 13 of the upper mold 11 and the recess portion 14 of the lower mold 12. Next, as shown in FIG. 3, the upper mold 11 is made to come close to the lower mold 12, and the primary molding 2 and the primary molding 3 are set so that they can be butted against each other. Due to the foregoing, the passage 8 is formed all over the circumference between the joint portions 4, 5 of the respective primary moldings 2, 3 in the mold 10 for secondary forming.

In the above state, the hot air flow generating device 20 is operated, and a flow of hot air is sent for heating the side wall of the passage 8. In this case, as shown in FIG. 4, the slide core 32 is moved by the operation of the cylinder 37 in the change-over device 30, and the air passage 33 of the slide core 32 is arranged between the runner 311 of the runner block 31 and the groove 22 of the lower mold 12 so that the flow of hot air can be blown.

Figure 4:
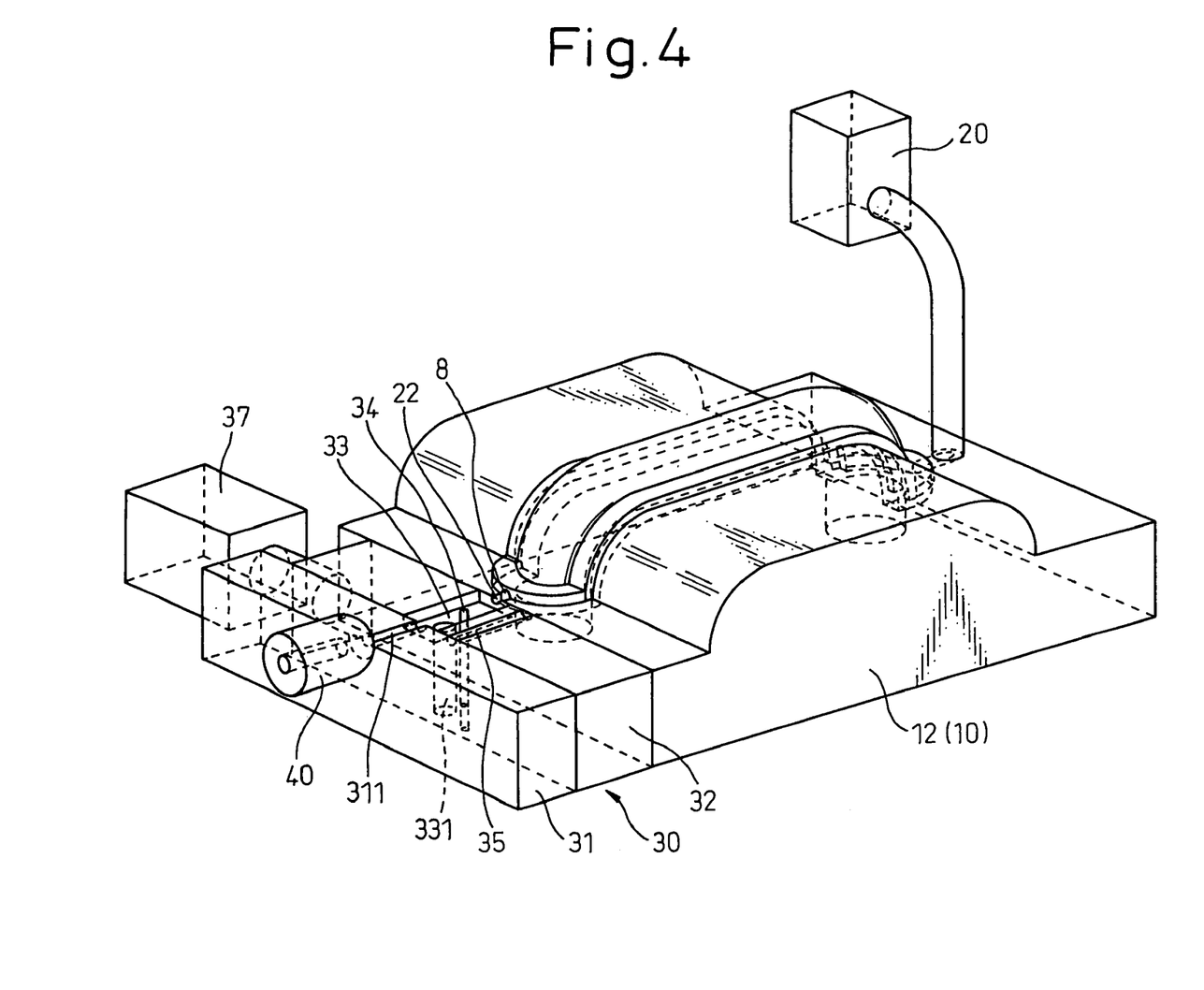
FIG. 4 is a perspective view showing an action of a change-over device in a state in which a flow of hot air is blown.
Figure 5:
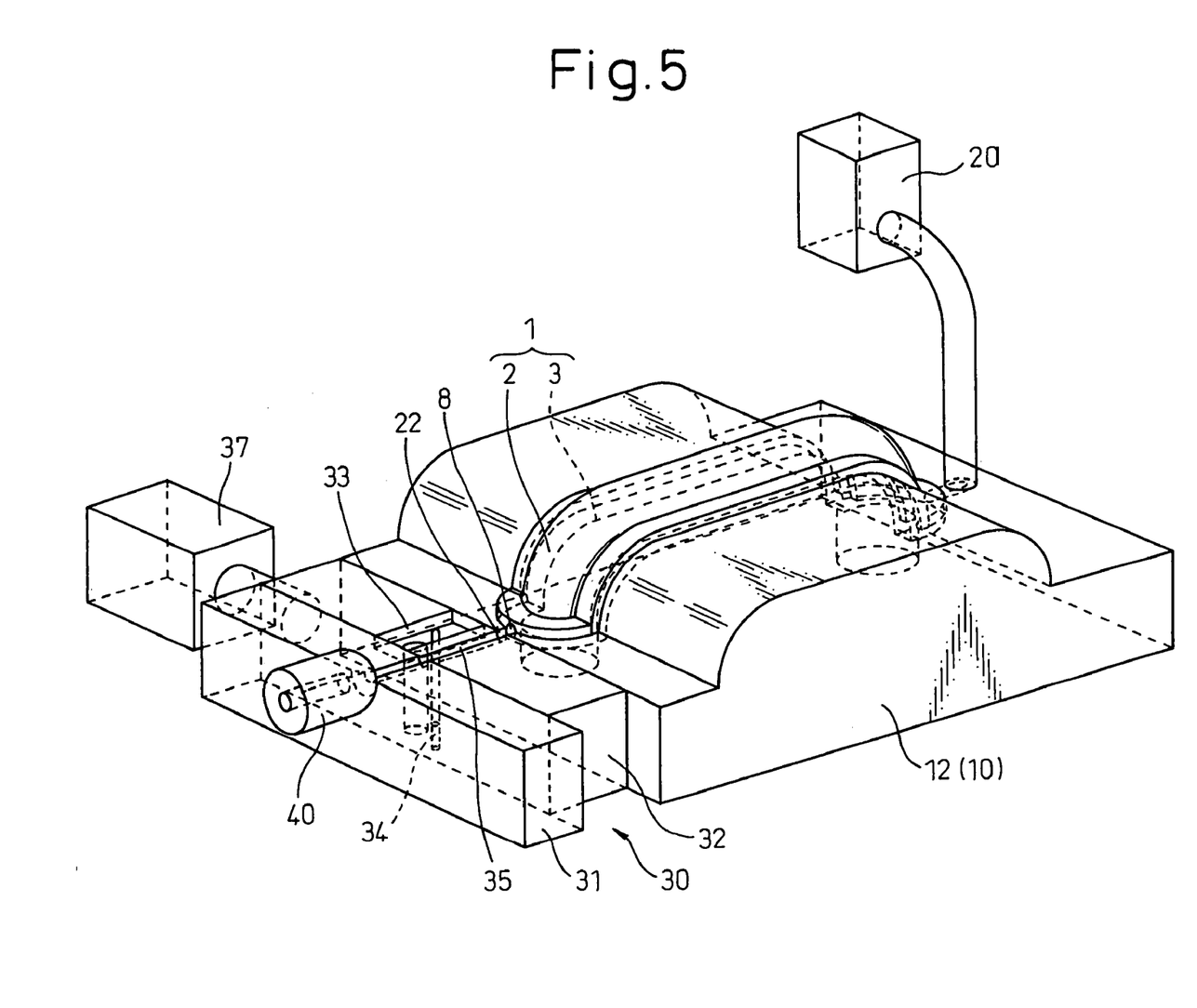
FIG. 5 is a perspective view showing an action of a change-over device in a state in which resin material can be injected.

In this connection, in order to plainly show the state of change-over conducted by the change-over device 30, the upper mold is omitted in FIGS. 4 and 5.

A flow of hot air is sent from the hot air flow generating device 20 into the through-hole portion 17 (shown in FIG. 3) in the upper mold 11 (shown in FIG. 3) and flows into the passage 8 in the mold 10. The side wall of the passage 8 is heated by the flow of hot air. The flow of hot air is made to flow from the passage 8 in the mold 10 into the groove 22 and is directed to the change-over device 30. In the change-over device 30, the air passage 33 is opened and the injection passage 35 is closed. Therefore, the flow of hot air, which has flowed in the mold 10, flows in the air passage 33. Since the thermocouple 34 is arranged in the air passage 33, the temperature can be measured at a position close to the outlet of the flow of hot air. When the temperature is raised to a predetermined temperature (for example, 100° C.), the slide core 32 is moved and changed over so that the resin material can be injected. The flow of hot air, which has flowed in the air passage 33, is discharged from the air discharge passage 331 into the atmospheric air.

As the flow of hot air is discharged into the atmospheric air, the flow of hot air is not directly blown to the injection nozzle 40. Therefore, the temperature can be controlled without raising the temperature of the injection nozzle by the flow of hot air.

Next, as shown in FIG. 5, when the change-over device 30 is operated and the opening passage is changed over from the air passage 33 to the injection passage 35, the hot air flow generating device 20 is turned off and the flow of hot air is shut off by the change-over device 30.

Then, a resin material, the temperature of which is, for example, 280° C., is injected from the injection nozzle 40 and poured from the injection passage 35 into the mold 10. The resin material is charged into the passage 8, so that the primary moldings 2, 3 can be joined to each other.

After cooling, the mold is opened, and the secondary molding (the intake manifold) 1, which has been integrally formed, is taken out from the mold 10.

As described above, according to the method of manufacturing the resin molding (the intake manifold) 1 of the embodiment, before the resin material for secondary forming is injected, a flow of hot air is blown from the end portion on the opposite side to the injection nozzle 40 so as to heat the side wall of the passage 8 in the mold and the temperature at a position close to the outlet of the flow of hot air is measured at the same time. That is, the thermocouple 34 is arranged in the air passage 33 of the change-over device 30 and the temperature at the position is actually measured by the thermocouple 34 and controlled. Therefore, the injected resin material can be uniformly cured and the deposition property can be enhanced and the depositing strength can be prevented from being deteriorated.

Either the air passage 33 or the injection passage 35 can be selectively changed over by the change-over valve (the slide core 32) of the change-over device 30. Therefore, each step of the secondary forming can be easily controlled and the cycle time can be shortened.

Further, at the time of blowing a flow of hot air, before the flow of hot air reaches the injection nozzle 40, it is discharged into the atmospheric air. Therefore, it is possible to prevent a change in the temperature of the injection nozzle 40 which is controlled, and the resin material can be injected at a uniform temperature.

In this connection, the change-over device of the present invention is not limited to the above specific embodiment. As long as the change-over device is composed so that it can instantaneously change over between the passage for a flow of hot air and the injection of the resin material, any change-over device may be employed.

Figure 6:
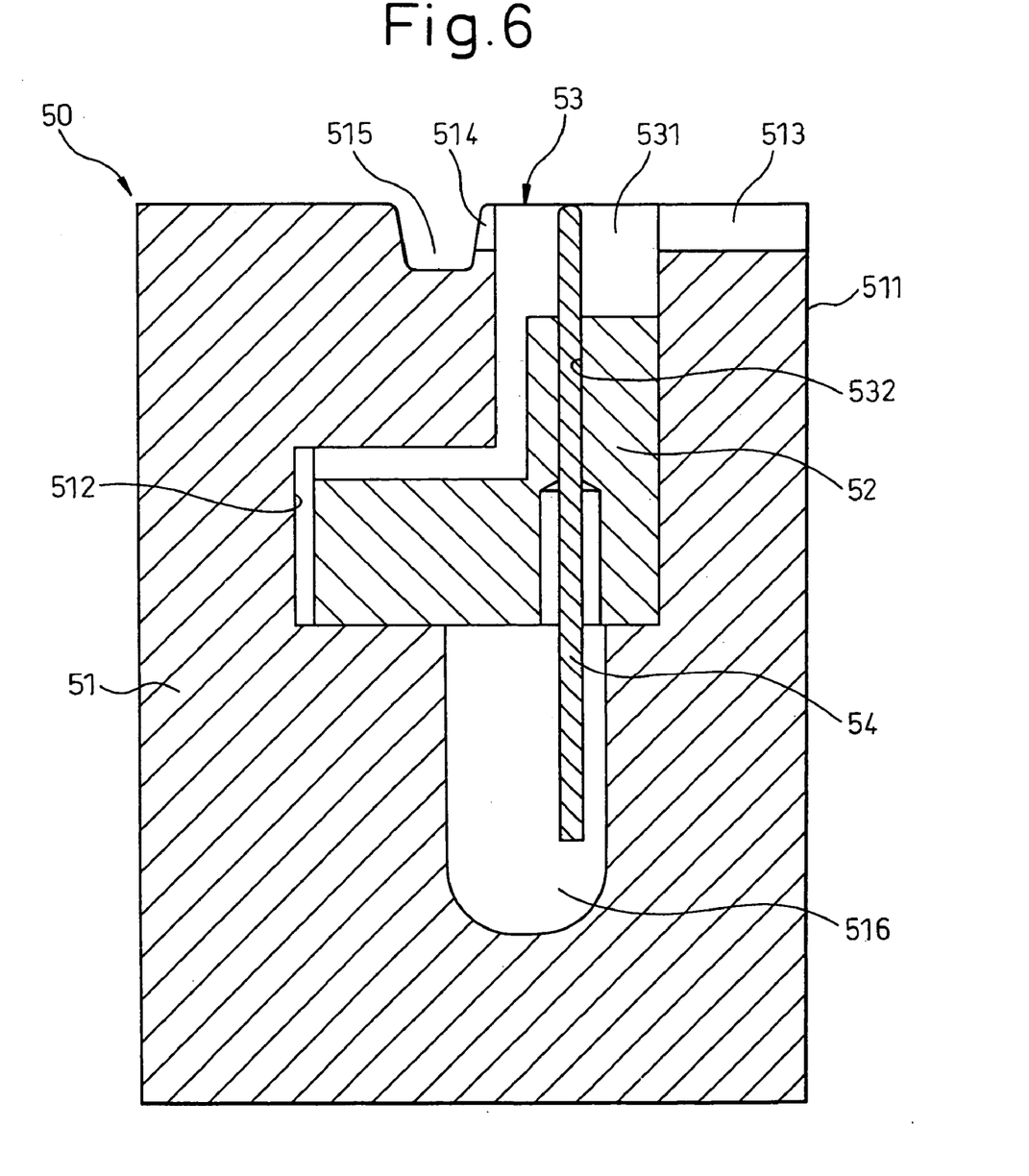
FIG. 6 is a sectional view showing a change-over device (showing a section taken on line A-A in FIG. 7) of another embodiment.
Figure 7:
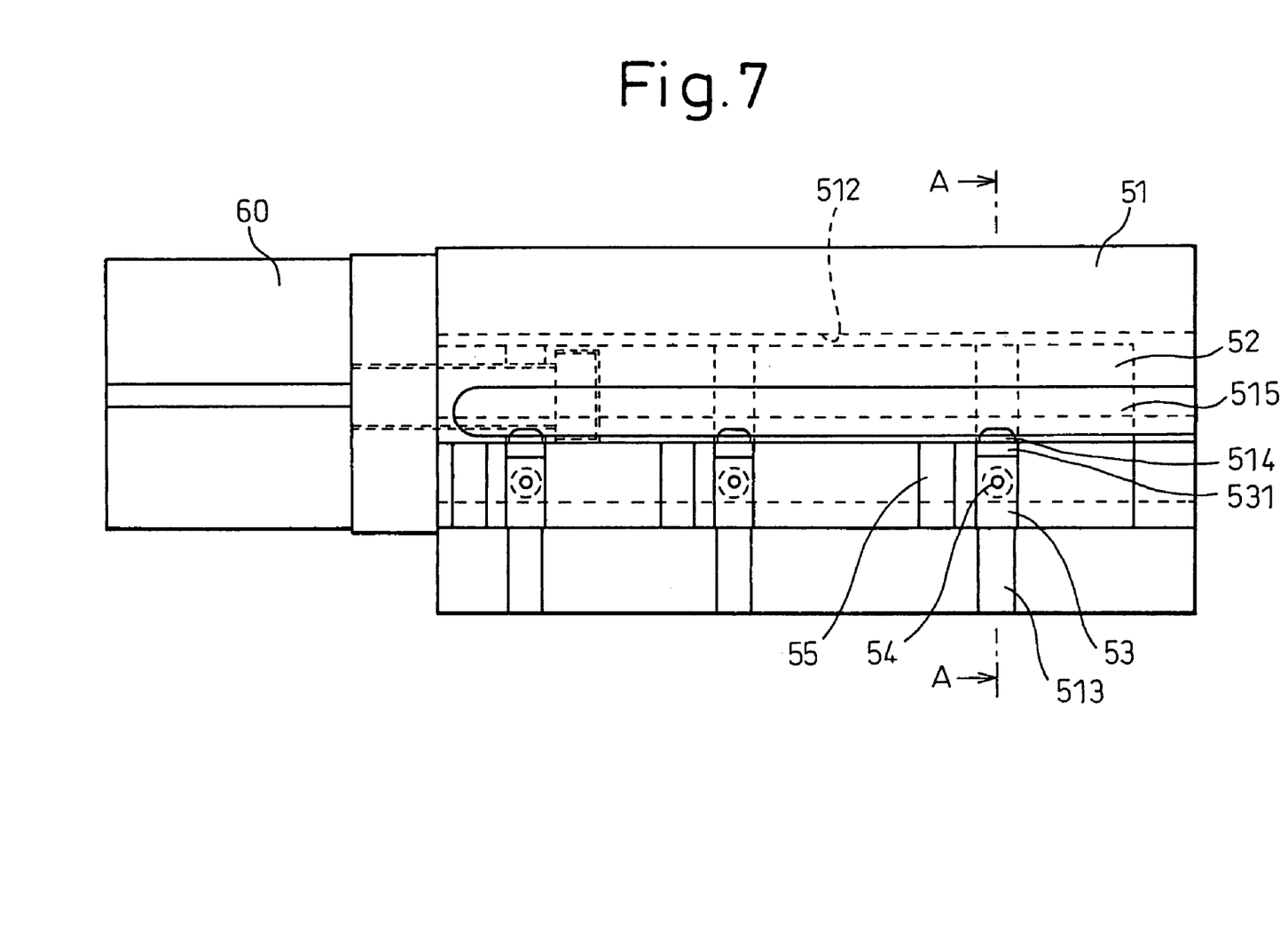
FIG. 7 is a front view showing the change-over device shown in FIG. 6.
Figure 8:
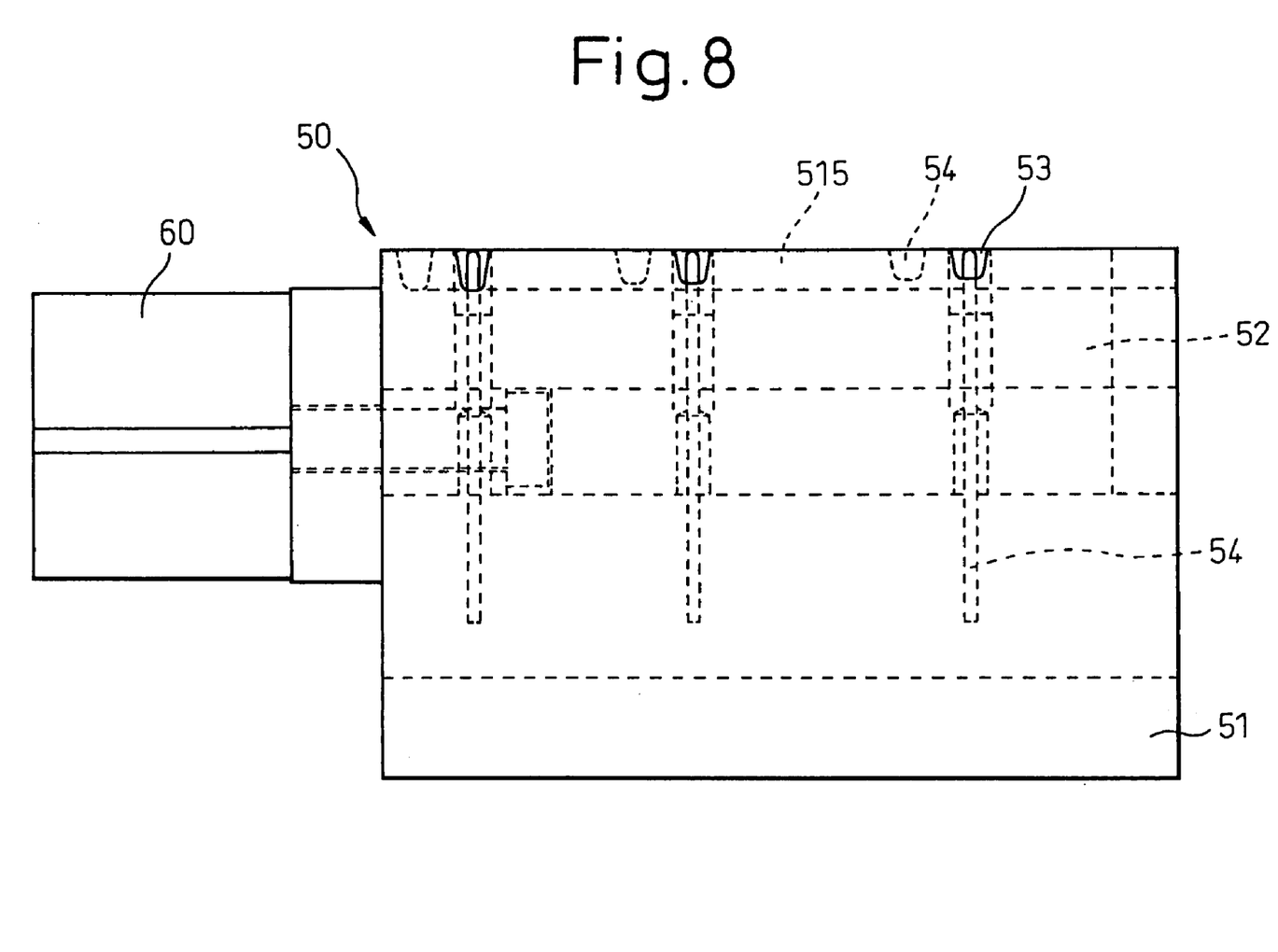
FIG. 8 is a plan view showing the change-over device shown in FIG. 6.

For example, as shown in FIGS. 6 to 8, the change-over device 50 includes: a runner block 51 having a contact face 511 attached to one end face of the lower mold 12; a slide core 52 which is a change-over valve slidably operated in the runner block 51; and a thermocouple 54, which is attached to the slide core 52, which is a temperature sensor slidably moving together with the slide core 52.

The runner block 51 includes: a contact face 511 attached to one end face of the lower mold 12; a guide groove 512 to slidably guide the slide core 52; a first guide passage 513 connected to the passage 22 of the lower mold 12; a runner 515 connected to the injection nozzle 60 via the second guide passage 514; and an air discharge passage 516 to discharge air outside to the exit.

In the slide core 52, two grooves, which compose one set of grooves, are formed in the direction perpendicular to the moving direction of the slide core 52. In the embodiment, three sets of grooves are formed so that an intake manifold used for a three cylinder engine can be composed.

One of the grooves in one set composes an air passage 53. A flow of hot air, which has been blown from the hot air flow generating device 20, flows in this air passage 53. The L-shaped air discharge groove 531, which can be connected to the air discharge passage 516, and the thermocouple insertion hole 532, into which the thermocouple 54 is inserted, are provided in this air passage 53. The other groove composes an injection passage 55, that is, the other groove composes a passage for the resin material injected from the injection nozzle 40.

Then, the slide core 52 is connected to the cylinder 60, and the slide core 52 is moved so that the passage connected to the groove 22 of the lower mold 12 can be selectively arranged in either the air passage 53 or the injection passage 55.

Accordingly, it is possible to instantaneously change over between the air passage 53 and the injection passage 55. Therefore, the cycle time of an inflow of the flow of hot air and the injecting action of the resin material can be shortened.

At this time, in the case where the air passage 53 is open to the groove 22 of the lower mold 12, the temperature of a flow of hot air is measured by the thermocouple 54, and the flow of hot air flows from the air discharge groove 532 into the discharge passage 516 and discharges into the atmosphere. Due to the foregoing, the flow of hot air is not sent to the injection nozzle from which the resin material is injected. Therefore, at the time of injecting the resin material, the temperature can be controlled, and the deposition property can be enhanced and the deterioration of the depositing strength can be prevented.

It should be noted that the heating medium is not limited to heated air. A heated fluid, for example, heated gas or heated water or heated oil may be used. Further, concerning the thermocouple, it is possible to use a commonly used temperature sensor, which is on the market, such as a thermistor.

While the invention has been described by reference to specific embodiments chosen for purposes of illustration, it should be apparent that numerous modifications could be made thereto by those skilled in the art without departing from the basic concept and scope of the invention.

The invention claimed is:

1. A change-over device for changing over between a heating medium and a resin material at a time of a secondary forming of a plurality of primary moldings formed in a primary forming, wherein:
   a joint portion is formed on each of the plurality of primary moldings,
   a pipe-shaped passage is formed on a joining face of each of the joint portions,
   a secondary molding is formed by injecting the resin material into an injection passage formed by the pipe-shaped passages when the plurality of primary moldings are set in a mold for the secondary forming and respective pipe-shaped passages are butted to each other, and
   the change-over device can change over between an inflow of the heating medium and an injection of the resin material a time of forming the secondary molding,
   the change-over device comprising: a runner block arranged at a position close to an injection port for the resin material for the secondary forming; and a slide core relatively moved with respect to the runner block, wherein
   a guide passage connected to the injection passage is formed in the runner block, a heating medium passage and resin material passage are arranged in parallel with each other in the slide core, and the slide core moves the heating medium passage and the resin material passage to a position at which either the heating medium passage or the resin material passage can be selectively opposed to the guide passage.

2. A change-over device for changing over between the heating medium and the resin material at the time of the secondary forming according to claim 1, wherein a heating medium discharge passage connected to the heating medium passage is formed in the slide core, and the heating medium is discharged into the atmosphere when the heating medium passage is in communication with the heating medium discharge passage.

3. A change-over device arranged at a position close to an injection port for injecting a resin material into a mold, the change-over device comprising:
   a runner block for dividing a mold side passage on a forming mold side and an injection side passage on an injection port side; and
   a movable core provided in the runner block, which can be moved relatively with respect to the mold side passage and the injection side passage,
   the movable core including:
   a first passage capable of communicating the mold side passage with the injection side passage; and
   a second passage which is shut off from the injection side passage, capable of communicating with the mold side passage, and with the discharge passage for a heating medium, wherein
   when the resin material is injected from the injection port, the movable core is moved so that the mold side passage and the injection side passage can communicate with each other by the first passage, and when the heating medium is discharged from the mold side passage, the movable core is moved so that the mold side passage and the injection side passage can be shut off from each other and the mold side passage can communicate with the discharge passage for the heating medium.

4. A change-over device according to claim 3, wherein the heating medium is heated air which is heated for heating a primary molding arranged in the mold, and
   the discharge passage is a passage for discharging the heated air, into the atmosphere.

5. A change-over device according to claim 3, wherein a temperature sensor for detecting a temperature of the heating medium is arranged in the second passage.

6. A change-over device according to claim 3, wherein the runner block and the movable core are arranged facing a mold split face of the mold, and the mold side passage, the injection side passage, the first passage and the second passage are divided between the dividing faces opposed to each other.

7. A change-over device according to claim 3, wherein the movable core is a slide core capable of sliding with respect to the runner block, and the first passage and the second passage are arranged in parallel with each other.

8. A change-over device according to claim 4, wherein a temperature sensor for detecting a temperature of the heating medium is arranged in the second passage.

9. A change-over device according to claim 4, wherein the runner block and the movable core are arranged facing a mold split face of the mold and the mold side passage, the injection side passage, the first passage and the second passage are divided between dividing faces opposed to each other.

10. A change-over device according to claim 5, wherein the runner bock and the movable core are arranged facing a mold split face of the mold and the mold side passage, the injection side passage, the first passage and the second passage are divided between dividing faces opposed to each other.

11. A change-over device according to claim 4, wherein the movable core is a slide core capable of sliding with respect to the runner block, and the first passage and the second passage are arranged in parallel with each other.

12. A change-over device according to claim 5, wherein the movable core is a slide core capable of sliding with respect to the runner block, and the first passage and the second passage are arranged in parallel with each other.

13. A change-over device according to claim 6, wherein the movable core is a slide core capable of sliding with respect to the runner block, and the first passage and the second passage are arranged in parallel with each other.

* * * * *